United States Patent [19]

Zucchini et al.

[11] 4,305,840

[45] Dec. 15, 1981

[54] CATALYST-FORMING COMPONENTS AND CATALYSTS PREPARED THEREFROM USEFUL IN THE POLYMERIZATION OF OLEFINS

[75] Inventors: Umberto Zucchini, Ferrara; Gianni Pennini, Porotto; Illaro Cuffiani, Ferrara, all of Italy

[73] Assignee: Montedison S.p.A., Milan, Italy

[21] Appl. No.: 88,162

[22] Filed: Oct. 25, 1979

[30] Foreign Application Priority Data

Oct. 26, 1978 [IT]  Italy .............................. 29140 A/78

[51] Int. Cl.³ ............................................. C08F 4/64
[52] U.S. Cl. ............................ 252/429 B; 252/428; 252/430; 252/431 R; 252/431 C; 526/124; 526/125
[58] Field of Search .............. 252/429 B, 430, 431 R, 252/431 C, 428

[56] References Cited

U.S. PATENT DOCUMENTS

| | | | |
|---|---|---|---|
| 3,833,515 | 9/1974 | Amtmann | 252/429 B |
| 3,859,231 | 1/1975 | Kochhar et al. | 252/429 B X |
| 4,071,672 | 1/1978 | Kashiwa | 252/429 B X |
| 4,085,276 | 4/1978 | Toyota et al. | 252/429 B X |
| 4,115,319 | 9/1978 | Scata et al. | 252/431 R X |
| 4,120,820 | 10/1978 | Birkelbach | 252/429 B X |

*Primary Examiner*—Patrick Garvin

[57] ABSTRACT

There are disclosed new catalyst-forming components and catalysts prepared therefrom which, used in the polymerization of olefins, result in high yields of polyolefins having a narrow molecular weight distribution and which do not require special purifying after-treatments for the removal of catalyst residues. More particularly, the new catalyst components and catalysts prepared from them are useful in the polymerization of ethylene or alpha-olefins $CH_2=CHR$, in which R is an alkyl or aryl radical of from 1 to 8 carbon atoms, or mixtures of ethylene with said alpha-olefins.

5 Claims, No Drawings

CATALYST-FORMING COMPONENTS AND CATALYSTS PREPARED THEREFROM USEFUL IN THE POLYMERIZATION OF OLEFINS

THE PRIOR ART

As is known, in the polymerization of ethylene or alphaolefins or mixtures of ethylene with alpha-olefins such as propylene, with highly active, high-yield catalysts, there is need for means for disposing of the catalyst residues without subjecting the polymer or copolymer to special purification after-treatments while also obtaining a polymer having a narrow molecular weight distribution.

Catalysts for achieving such results are known in the art. However, the methods known up to now for preparing such catalysts are burdensome inasmuch as they involve, in general, the reduction of a tetravalent Ti alcoholate with an Al-alkyl halide complexed with a Mg dihalide, or the reaction of a Ti alcoholate in the form of a complex with a Mg dihalide.

THE PRESENT INVENTION

One object of this invention is to provide new catalyst components and catalysts prepared from them which, used in the polymerization of ethylene or alpha-olefins or mixtures of ethylene with alpha-olefins, give high yield of polymers, or copolymers, having a narrow molecular weight distribution.

That and other objects are achieved by this invention which provides a simplified method for preparing catalyst components, and catalysts obtained therefrom, which result in high yields of polyethylene or polyolefins, or of copolymers of ethylene with alpha-olefins $CH_2=CHR$ in which R is an alkyl or aryl radical of from 1 to 8 carbon atoms, which polymers or copolymers also have a commercially feasible, and narrow, molecular weight distribution.

Said method of the invention consists in reacting, in an apolar solvent:

(a) the product of the reaction between:
  (a.1) a compound of trivalent Ti or V of the formula $MeR_nX_{3-n}$ wherein Me is Ti or V, R is a group OR', NR'$_2$ or OCOR' wherein R' is an alkyl, a cycloalkyl or aryl radical with from 1 to 12 carbon atoms, X is a halogen and $0 \leq n \leq 3$;
  (a.2) an organic compound containing at least one OH group selected from the aliphatic, cycloaliphatic and aromatic alcohols and thioalcohols having from 1 to 18 carbon atoms, the phenols and thiophenols having from 6-18 carbon atoms and the silanols $R'_pSi(OH)_{4-p}$ wherein R' has the meaning already indicated and $1 \leq p \leq 3$, and
  (a.3) a Mg compound selected from Mg oxide and hydroxide, Mg salts of inorganic oxygenated acids and $R_qMgX_{2-q}$ compounds, wherein R is a radical OR', OH or OCOR', where R' has the meaning already indicated, X is halogen and $0 \leq q \leq 2$; with (b) a compound capable of reacting with the OH groups of compund (a.2) when the Mg compound is a dihalide, and of reacting with such groups and contemporaneously converting at least partially the Mg compound to dihalide when the Mg compound is other than a dihalide.

Compound (a.1) is preferably a Ti trihalide, in particular $TiCl_3$ or $TiBr_3$; it may also be a Ti halogen-alcoholate.

Compound (a.2) is preferably an aliphatic alcohol, such as, for instance ethanol, n-butanol, 2-ethyl-hexanol, octanol or a phenol such as, for instance, phenol or p-cresol.

Examples of useful silanols include trimethylsilanol, triphenylsilanol, diphenylsilandiol.

Compound (a.3) is preferably a Mg dihalide, such as, for instance, $MgCl_2$ or $MgBr_2$, a Mg dialcoholate or chloroalcoholate such as, for instance, $ClMgOC_2H_5$, $Mg(O-n-C_4H_9)_2$, or a Mg carboxylate, such as, for instance, Mg acetate, Mg oxide or hydroxide or a Mg salt of an oxygenated inorganic acid such as, for instance, basic Mg carbonate, an organometallic Mg compound such as $ClMg-n-C_4H_9$, $ClMgC_2H_5$, $n-C_4H_9-Mg-O-n-C_4H_9$, $Mg(sec-C_4H_9)_2$ and their complexes with ethers.

The Mg compound may contain, in the form of a complexing compound, a compound capable of reacting as compound (b). In such case, the use of the compound as indicated in (b) becomes superfluous. An example of these complexes is $MgCl_2 \cdot 2Al(C_2H_5)Cl_2$.

When the Mg compound is a dihalide, compound (d) is either an Al-trialkyl or an Al-alkyl halide, such as, for instance, $Al(C_2H_5)_3$, $Al(C_2H_5)Cl_2$, $Al(C_2H_5)_2Cl$ or $SiCl_4$, a halogen-silane such as $Cl_3SiCH_3$, $ClSi(CH_3)_3$, $Cl_3SiH$, or a halide such as $AlCl_3$, $SnCl_4$, $TiCl_4$, $BCl_3$, HCl.

When the Mg compound is other than a Mg dihalide, there is used a halogenating agent preferably selected from $SiCl_4$, $TiCl_4$, $Al(C_2H_5)Cl_2$, and hydrogen halides such as, for instance, HCl or HBr.

Compound (a.2) is used in quantities of at least 2 and up to 50 moles per mole of Ti compound (a.1).

The ratio in moles between compounds (a.1) and (a.3) ranges from 1:50 to 10:1, and preferably between 1:5 and 2.5:1.

Compound (b) is used in quantities greater than 0.2 mole per mole of compound (a.2). In general, there are used ratios 1:1 or slightly greater. Higher ratios are superfluous.

Preferably, the Ti compound, the Mg compound (preferably $TiCl_3$ and $MgCl_2$ respectively) and the alcohol are reacted in a halogenated hydrocarbon solvent, such as dichloroethane, tetrachloroethane or trichloroethylene, in which dissolution of the reaction product occurs.

The solution is then reacted with compound (b).

According to an alternative embodiment of the invention, the Ti and Mg compounds, preferably $TiCl_3$ and $MgCl_2$ respectively, are reacted separately with the alcohol in a hydrocarbon solvent in which dissolution of the formed complexes occurs. The two solutions are then combined and reacted with compound (b).

The reaction with compound (b) in general is carried out at temperatures comprised between room temperature and 150° C.

Another method of preparing the catalytic component of the invention, and one which results in catalysts capable of producing polymers with a controlled morphology, in particular with a narrow particle size distribution, consists in emulsifying, in a hydrocarbon solvent, an adduct in the molten state of Mg chloride with the alcohol, then adding, under stirring, the Ti compound or its reaction product with the alcohol, and cooling down the mixture in order to solidify the particles forming the emulsion.

The resulting suspension or the solid product separated from it are then treated with compound (b).

From the catalytic components of the invention, by reaction with organometallic Al compound, preferably Al-trialkyls or Al-alkyl halides, such as, for instance, $Al(C_2H_5)_3$, $Al(n-C_4H_9)_3$ and $Al(C_2H_5)_2Cl$, there are obtained catalysts particularly suited for the polymerization of ethylene and of mixtures thereof with minor proportions of alpha-olefins.

The Al/Ti ratio in the catalyst, in general, is comprised between 1 and 1000.

The polymerization is carried out according to known methods in a liquid phase, in the presence of an inert hydrocarbon diluent, or in a gaseous phase and, in general, at temperatures from 50° to 150° C.

It was furthermore found that the catalyst components of this invention can be advantageously used in the polymerization of the alpha-olefins $CH_2=CHR$, wherein R is an alkyl or aryl radical with from 1 to 8 carbon atoms, or mixtures of said olefins with minor proportions of ethylene, provided that the components contain, in a chemically combined form, also an electron-donor compound in an amount comprised between 0.2 and 3 moles per g-atom of Ti or V present in the components.

The electron-donor compound preferably is an alkyl, cycloalkyl or aryl ester of an aromatic acid, as for example an alkyl ester of benzoic acid or of p-toluic acid. Examples of said esters are ethyl benzoate and methyl p-toluate.

The electron-donor compound is reacted with compound (a.1) and/or (a.2) or with the reaction product (a) or during the reaction of (a) with (b).

Preferably compound (a.1) is $TiCl_3$, compound (a.2) is an aliphatic or cycloaliphatic alcohol containing from 4 to 16 carbon atoms, as for instance n-butanol or 2-ethylhexanol, and compound (a.3) is $MgCl_2$.

$TiCl_3$, the alcohol and $MgCl_2$ are reacted in the presence of a hydrocarbon solvent under such conditions of temperature and proportion of alcohol with respect to $MgCl_2$ that a solution is obtained. The solution is then reacted with $TiCl_4$ first at room or lower temperature and successively at a higher temperature, i.e. at 60° C. or more.

The catalyst components containing the electron-donor compound are used in admixture with Al-alkyl compounds to form, according to known methods, catalysts for the stereospecific polymerization of the alpha-olefins $CH_2=CHR$, wherein R has the meaning hereinbefore explained, or mixtures thereof with minor proportions of ethylene.

The polymerization of the alpha-olefins is carried out according to known methods in liquid or gas phase, at a temperature generally comprised between 50° and 90° C.

The following examples are given to illustrate the invention in more detail and are not intended to be limiting.

EXAMPLE 1

Into a 250 cc flask, provided with a stirrer, a dropping funnel and a reflux cooler, there were introduced, in any desired order, and in a nitrogen atmosphere, 3.4 g (35.7 mMoles) of anhydrous $MgCl_2$, 7 g (34.5 mMoles of Ti) of $TiCl_3.1/3AlCl_3$ (Kronos ATR 1080 with Ti=23.6%) and 50 cc of anhydrous 1,2-dichloroethane.

Into this suspension there were dripped, under stirring, 16.4 cc (284 mMoles) of anhydrous ethyl alcohol. The suspension was then reflux-heated and maintained at this temperature for about one hour until a clear green-colored solution was obtained.

Into this solution, maintained at 50° C. and under stirring, there were then dripped, in 1.5 hours, 32.2 cc (280 mMoles) of $SiCl_4$. Thereafter, the reaction mass was reflux-heated for 3 hours.

The red-brown suspension thus obtained was then cooled down to 50° C. and, after decanting, the liquid phase was removed from it by siphoning.

The solid residue was washed once with about 100 cc of 1,2-dichloroethane, and then several times, at room temperature, with portions of about 100 cc of anhydrous hexane each time, up to disappearance of the chlorine ions from the washing solvent. The solid was then dried under vacuum (10–20 mmHg) at 50° C. for 3 hours. Thereby were obtained 10.7 g of a catalytic solid containing 14.15% of Ti.

The polymerization of ethylene was carried out in a 2.5 lt autoclave fitted with a stirrer, by introducing into the same in the given order: 1000 cc of anhydrous hexane, 1.5 g of Al—i—$Bu_3$, 0.0121 g of catalytic solid, 3 $kg/cm^2$ of hydrogen, and bringing the total pressure up to 14 kg/sq.cm with ethylene. These conditions were maintained for 4 hours at 75° C. and there were obtained 302 g of polyethylene (see Table I).

EXAMPLE 2

Example 1 was repeated, but using 5.3 g (26 mMoles of Ti) $TiCl_3.\frac{1}{3}AlCl_3$; 5 g of $MgCl_2$ (52.6 mMoles); 50 cc of 1,2-dichloroethane; 18.3 cc of anhydrous ethyl alcohol (316 mMoles); 36 cc of $SiCl_4$ (313 mMoles).

Thereby were obtained 6.3 g of a brown, catalytic solid containing 6.45% of Ti. Ethylene was polymerized as in Example 1, but using 0.0091 g of catalytic solid, thereby obtaining 273 g of polyethylene (Table I).

EXAMPLE 3

Example 1 was repeated, but using 5.3 g (26 mMoles of Ti) of $TiCl_3.\frac{1}{3}AlCl_3$; 10 g of $MgCl_2$ (105 mMoles); 70 cc of 1,2-dichloroethane; 30.4 cc (525 mMoles) of anhydrous ethyl alcohol; 60.3 cc (525 mMoles) of $SiCl_4$.

Thereby were obtained 15.5 g of a brown catalytic solid containing 2.8% of Ti. The polymerization test of Example 1 was repeated, but using 0.0079 g of catalytic solid and obtaining 90 g of polyethylene (Table I).

EXAMPLE 4

Example 1 was repeated, but using 10.15 g (50 mMoles of Ti) of $TiCl_3.\frac{1}{3}AlCl_3$; 70 cc of 1,2-dichloroethane; 22 cc (380 mMoles) of anhydrous ethyl alcohol; 45 cc (392 mMoles) of $SiCl_4$.

There were obtained 6.2 g of a brown catalytic solid containing 19.1% of Ti. By repeating the polymerization test of Example 1, but using 0.0517 g of catalytic solid, there were obtained 208 g of polyethylene (Table I).

EXAMPLE 5

Example 1 was repeated but using 7.0 g (34.5 mMoles Ti) of $TiCl_3.\frac{1}{3}AlCl_3$; 3.4 g (35.7 mMoles) $MgCl_2$; 50 cc of 1,2-dichloroethane; 16.4 cc (284 mMoles) anhydrous ethyl alcohol; 16.1 cc (140 mMoles) of $SiCl_4$.

Thereby were obtained 8.9 g of a brown catalytic solid containing 14.3% of Ti. By repeating the polymerization test of example 1, but using 0.0142 g of catalytic solid, 180 g of polyethylene (Table I) were obtained.

EXAMPLE 6

Example 1 was repeated but using 7.0 g (34.5 mMoles Ti) of TiCl$_3$.$\frac{1}{3}$AlCl$_3$; 3.4 g (35.7 mMoles) of MgCl$_2$; 50 cc 1,2-dichloroethane; 16.4 cc (284 mMoles) of anhydrous ethyl alcohol; 64.4 cc (560 mMoles) of SiCl$_4$.

Thereby were obtained 9.1 g of a brown catalytic solid containing 15% of Ti.

By repeating the polymerization test of Example 1, but using 0.0159 g of a catalytic solid, 380 g of polyethylene (Table I) were obtained.

EXAMPLE 7

MgCl$_2$ and TiCl$_3$.$\frac{1}{3}$AlCl$_3$ were separately dissolved in two small flasks. In one of the flasks, 3.4 g (35.7 mMoles) of MgCl$_2$; 8.2 cc (142 mMoles) anhydrous ethyl alcohol; and 30 cc of anhydrous trichloroethylene were heated at reflux temperature until a solution was obtained. In the other small flask, 7.0 g (34.5 mMoles Ti) of TiCl$_3$.$\frac{1}{3}$AlCl$_3$; 16.4 cc (284 mMoles) anhydrous ethyl alcohol and 70 cc anhydrous trichloroethylene were heated for 30 minutes at reflux temperature until a solution was formed.

The two solutions were then combined in a flask kept at 50° C., and into which flask were fed, in 1.5 hours, 49 cc (427 mMoles) of SiCl$_4$.

The reaction product (a brown suspension) was, thereupon, heated for 3 hours at reflux temperature, and finally washed and dried as described in Example 1.

There were thus obtained 8.5 g of a brown catalytic solid containing 16% of Ti. The polymerization test of Example 1 was repeated, but using using 0.015 g of catalytic solid, thereby obtaining 115 g of polyethylene (see Table I).

EXAMPLE 8

Operating according to the same procedures as described in Example 1, a solution of 3.5 g (17.2 mMoles of Ti) of TiCl$_3$.$\frac{1}{3}$AlCl$_3$; 3.2 g (33.6 mMoles) MgCl$_2$; 50 cc of 1,2-dichloroethane; 12 cc (207 mMoles) anhydrous ethyl alcohol was prepared and added dropwise, in 1.5 hours, to a suspension (maintained at 50° C.) of 13.8 g (104 mMoles) of AlCl$_3$ in 30 cc of 1,2-dichloroethane.

After heating at reflux temperature for 2 hours, the suspension was treated as described in Example 1, 3.4 g of a brown catalytic solid which contained 11.35% of Ti being thus obtained.

Thereupon, the polymerization test of Example 1 was repeated, but using 0.0104 g of catalytic solid, and 160 grams of polyethylene were obtained (see Table I).

EXAMPLE 9

Operating according to the procedure described in Example 1, there was prepared in a small flask a solution of the following composition: 5.7 g (28 mMoles Ti) of TiCl$_3$.$\frac{1}{3}$AlCl$_3$; 5.3 g (55.6 mMoles) of MgCl$_2$; 80 cc of 1,2-dichloroethane; 19.7 cc (340 mMoles) of anhydrous ethyl alcohol.

To the solution thus obtained, maintained at a temperature of 20° C., there were added, in 2 hours, 190 cc of a heptane solution containing 19.4 g (170 mMoles) of Al(C$_2$H$_5$)$_3$.

Once the feeding had been completed, the suspension was heated for 2 hours at reflux temperature and then treated as described in Example 1.

Thereby were obtained 8.6 g of a brown catalytic solid containing 9.65% of Ti. By repeating the polymerization test of Example 1, but using 0.0128 g of catalytic solid, 150 g of polyethylene (Table I) were obtained.

EXAMPLE 10

The following components were heated for one hour at reflux temperature in a small flask: 6.1 g (30 mMoles Ti) of TiCl$_3$.$\frac{1}{3}$AlCl$_3$; 25 cc of dichloroethane; 10.8 cc (187 mMoles) of anhydrous ethyl alcohol; to obtain a solution.

In the same way, there was prepared a solution starting from: 3.15 g (30 mMoles) of ClMgOC$_2$H$_5$; 30 cc of 1,2-dichloroethane; 7 cc (121 mMoles) of anhydrous ethyl alcohol.

The two solutions were combined and added with 16 cc (139 mMoles) of SiCl$_4$ according to the procedure of Example 1; 3.9 of a brown catalytic solid containing 12.25% of Ti being obtained.

By repeating the polymerization test of Example 1, but using 0.0136 g of catalytic solid, 272 g of polyethylene (see Table I) were obtained.

EXAMPLE 11

In a flask the following reactants were put into contact with each other for 1.5 hours and at reflux temperature; 4 g (42 mMoles) of MgCl$_2$; 15 cc of 1,2-dichloroethane; 15.4 cc (168 mMoles) of anhydrous n-butyl alcohol. With a temperature of at least 50° C. being maintained, a solution was obtained.

Analogously, there was prepared another solution of: 3.23 g (21 mMoles) TiCl$_3$ of the HR type; 75 cc of 1,2-dichloroethane; 7.7 cc (84 mMoles) of anhydrous n-butyl alcohol.

The two solutions were thereupon combined and 56.7 cc (494 mMoles) of SiCl$_4$ were added, following the same procedure as described in Example 1. 4.5 g of a brown catalytic solid containing 5.55% of Ti were obtained.

The polymerization test of Example 1 was repeated, but using 0.0075 g of catalytic solid, 221 g of polyethylene (Table II) being obtained.

EXAMPLE 12

The following components were made to react with each other at 70° C. for 1 hour: 5.7 g (28 mMoles of Ti) of TiCl$_3$.$\frac{1}{3}$AlCl$_3$; 30 cc of 1,2-dichloroethane; 10.5 cc (115 mMoles) of anhydrous n-butyl alcohol. A solution (stable at a temperature of at least 70° C.) was obtained.

Analogously, there was prepared a solution with: 5 g (52 mMoles) of MgCl$_2$; 55 cc of 1,2-dichloroethane; 25 cc (230 mMoles) of anhydrous isoamyl alcohol.

The two solutions were combined at 70° C. and the new solution thus obtained was fed dropwise, in 2 hours, into a solution of 65 cc (566 mMoles) of SiCl$_4$ in 70 cc of 1,2-dichloroethane maintained at 60° C. The suspension thus obtained was then treated as described in Example 1.

There were obtained 9.1 g of brown catalytic solid containing 10.8% of Ti. Thereupon the polymerization test of Example 1 was repeated, but using 0.0104 g of catalytic solid. 226 g of polyethylene (Table II) were obtained.

EXAMPLE 13

Following the same procedure as described in Example 1, a solution was prepared by reacting: 0.914 g (4.5 mMoles of Ti) of TiCl$_3$.$\frac{1}{3}$AlCl$_3$; 0.286 g (3 mMoles) of MgCl$_2$; 5.6 cc (36 mMoles) of anhydrous 2-ethylhexyl alcohol; and 20 cc anhydrous toluene.

To this solution were then added, following the same procedure as in Example I, 7 cc (61 mMoles) of SiCl$_4$.

1.9 g of a brown catalytic solid containing 9.45% of Ti were obtained.

Repetition of the polymerization test of Example 1, but using 0.0098 g of the catalytic solid, resulted in 134 g of polyethylene (Table II).

EXAMPLE 14

At reflux temperature and for 5 hours the following reagents were made to react; 4 g (42 mMoles) of MgCl$_2$; 50 cc of n-hexane; 26.2 cc (167 mMoles) of anhydrous 2-ethylhexyl alcohol. Thereby was obtained a solution stable also at room temperature.

Analogously, there was prepared a second solution by reacting at 70° C. for 2 hours: 1.74 g (8.5 mMoles of Ti) of TiCl$_3$.⅓AlCl$_3$; 19 cc of anhydrous toluene; 6.7 cc (43 mMoles) of anhydrous 2-ethylhexyl alcohol, this solution being stable at room temperature.

The two combined solutions were then dripped, in 1.5 hours, into a solution consisting of 14.25 g (118 mMoles) of Al(C$_2$H$_5$)$_2$Cl and of 40 cc of n-hexane, maintained at 50° C. The suspension thus obtained was treated as described in Example 1, but carrying out all washings with n-hexane. 3.5 g of a catalytic solid containing 2.8% of Ti were obtained.

The polymerization test of Example 1 was repeated, but using 0.010 g of catalytic solid. Polyethylene was obtained in a yield of 226 g (Table II).

EXAMPLE 15

To 3.4 g (35.7 mMoles) of MgCl$_2$, suspended in 30 cc of 1,2-dichloroethane, were added, in a flask, 8.2 cc (142 mMoles) of anhydrous ethyl alcohol. On reflux-heating for 1 hour there was obtained a complete dissolution.

In another flask there were reflux-heated, for 2 hours, 7.0 g (34.5 mMoles of Ti) of TiCl$_3$.⅓AlCl$_3$; 25 cc of 1,2-dichloroethane; 31 cc (352 mMoles) of phenol.

No dissolution occurred. Thereupon the liquid phase was removed from the solid brown residue, and this residue added to the previously prepared MgCl$_2$ solution. Into that mixture, maintained at 50° C., there were dripped, in 1.5 hours, 32.2 cc (280 mMoles) of SiCl$_4$. The suspension thus obtained was thereupon treated as described in Example 1, and 7.7 g of a brown catalytic solid containing 13.3% of Ti were obtained.

The polymerization test described in Example 1 was repeated, but using 0.0048 g of the catalytic solid, thereby obtaining 158 g of polyethylene (Table II).

EXAMPLE 16

To a solution obtained by heating, for 1.5 hours, at reflux temperature, 7.0 g (34.5 mMoles of Ti) of TiCl$_3$.⅓AlCl$_3$; 67 cc of 1,2-dichloroethane, and 12.6 cc (138 mMoles) of anhydrous n-butyl alcohol there were added 3.3 g (34.6 mMoles) of MgCl$_2$ and then the mixture was refluxed for another 2 hours.

To the suspension thus obtained, there were added, over 1.5 hours, and at 50° C., 16 cc (193 mMoles) of SiCl$_4$. The reaction product was then treated as described in Example 1, 6.3 g of a catalytic solid containing 13.35% of Ti being obtained.

The polymerization test of Example 1 was repeated, but using 0.0154 g of catalytic solid, thereby obtaining 145 g of polyethylene (Table II).

EXAMPLE 17

In a flask were made to react for 3 hours at 140° C.:
7.5 g (78.7 mMols) of MgCl$_2$;
11.2 g (52.6 mMols) of TiCl$_3$.⅓AlCl$_3$;
50 cc of anhydrous Isopar G;
57.4 cc (367 mMols) of 2-ethylhexyl alcohol;
and there was obtained a solution which, after cooling down to room temperature, was dripped in 1 hour into a flask containing 400 cc (3650 mMols) of TiCl$_4$ maintained at 0° C. and under vigorous stirring. Thereafter the reaction mixture was heated up to 80° C. and maintained at this temperature for further 2 hours.

The precipitate that was thus formed, was then filtered at 80° C. and then washed repeatedly with anhydrous hexane, first at 80° C. and then at room temperature, until complete disappearance of the chlorine ions from the washing solvent.

After drying under the conditions described in ex. 1 there were obtained 14.1 g of a catalytic solid containing 12.1% of Ti.

Thereupon the polymerization test of example 1 was repeated but using 0.0044 g of the above catalytic solid, thereby obtaining 266 g of polyethylene (see Table II).

EXAMPLE 18

At 80° C. were made to react for 4 hours:
4.95 g (23 mMols) of TiCl$_3$; AlCl$_3$;
20 g (92.5 mMols) of diphenylsilandiol;
150 cc of 1,2-dichloroethane;
thereby obtaining a brown-coloured solution, to which was admixed, at a temperature of 70° C., a solution likewise heated to 70° C., and obtained by reflux-reacting for 10 minutes:
2.2 g (23 mMols) of MgCl$_2$;
5.4 cc (92.5 mMols) of anhydrous ethyl alcohol;
20 cc of 1.2-dichloroethane.

Into the new suspension thus obtained and still maintained at 70° C., there were dripped 32 cc (279 mMols) of SiCl$_4$ during a period of 1 hour and a half. After heating the reaction mixture for further 3 hours at 70° C., the precipitate that was formed was filtered at 40° C., washed twice with 1.2-dichloroethane and finally with anhydrous hexane at room temperature until full disappearance of the chlorine ions from the washing solvent.

After drying, under the conditions described in example 1, there were obtained 5.8 g of a catalytic solid containing 15.35% of Ti.

Thereupon the polymerization test of example 1 was repeated, but using 0.0097 g of the above catalytic solid, thereby obtaining 43 g of polyethylene (see Table II).

EXAMPLE 19 (Comparative Test Without MgCl$_2$)

Example 1 was repeated exactly but without the use of MgCl$_2$. Thereby were obtained 4.3 g of catalytic solid containing 28.5% of Ti. When the polymerization test of Example 1 was repeated, but using 0.0696 g of the catalytic solid of this Example only 28 g of polyethylene (Table III) were obtained.

EXAMPLE 20

A solution was prepared by reflux-heating for 30 minutes: 50 cc of 1.2-dichloroethane; 3.4 g (35.7 mMoles) of MgCl$_2$; 10.2 cc (175 mMoles) of anhydrous ethyl alcohol.

After the solution had been cooled down to 50° C., 7 g of TiCl$_3$.⅓AlCl$_3$ were added and the whole was reflux-heated again for 1 hour.

Thereupon the solution was brought down again to 50° C. and to the mixture thus obtained there were added 20.4 cc (178 mMoles) of SiCl$_4$, following the procedure of Example 1. 7.5 g of a catalytic solid containing 15% of Ti were obtained.

The polymerization test of Example 1 was repeated, but using 0.0149 g of the aforesaid catalytic solid, thereby obtaining 322 g of polyethylene (Table III).

EXAMPLE 21 (Use of TiCl$_4$ Instead of SiCl$_4$)

Example 1 was repeated, but using 30.7 cc of TiCl$_4$ (280 mMoles) instead of SiCl$_4$. Thereby were obtained 8 g of catalytic solid containing 19% of Ti. The polymerization test of Example 1 was repeated, but using 0.0075 g of the aforesaid catalytic solid, thereby obtaining 365 g of polyethylene (Table III).

EXAMPLE 22

In this instance, example 2 was repeated, but using 34.5 cc (315 mMols) of TiCl$_4$ instead of SiCl$_4$.

Thereby were obtained 10.5 g of a catalytic solid containing 14.35% of Ti.

The polymerization test of example 1 was repeated, but using 0.0028 g of the above catalytic solid, thereby obtaining 260 g of polyethylene (see Table III).

EXAMPLE 23

Operating in the same way as that described in Example 1, a solution was prepared which contained:
1.25 g (13 mMols) of MgCl$_2$:
3 cc (52 mMols) of anhydrous ethyl alcohol;
15 cc of 1.2-dichloroethane.

To this solution, maintained at 60° C., were added 4 g of Ti(O—n—C$_4$H$_9$) and the whole was reflux-heated for 30 minutes. To the suspension thus obtained were added at 50° C. 6 cc (52 mMols) of SiCl$_4$ and the whole was then heated for 5 hours at 80° C.

The solid thus obtained was filtered and then washed with anhydrous hexane until complete disappearance of the chlorine ions from the washing solvent.

After drying, under the conditions described in ex. 1, there were obtained 2.8 g of a catalytic solid which contained 11.75% of Ti.

Then there was repeated the polymerization test of Example 1, but using 0.0097 g of the above catalytic solid, thereby obtaining 90 g of polyethylene (see Table IV).

EXAMPLE 24

Operating at 80° C., the following components were made to react with each other:
5.6 g (35 mMols) of VCl$_3$;
14.5 cc (249 mMols) of anhydrous ethyl alcohol;
50 cc of 1.2-dichloroethane;
thereby obtaining a suspension which, at a temperature of 50° C., was admixed to a solution obtained by reacting, as described in Example 1:
3.4 g (35.7 mMols) of MgCl$_2$;
8.3 cc (142.5 mMols) of anhydrous ethyl alcohol;
30 cc of 1.2-dichloroethane.

Into the new suspension thus obtained were dripped, at 50° C., 45 cc (392 mMols) of SiCl$_4$. The suspension was then heated for 4 hours at 70° C., after which the catalytic solid was separated according to the procedure described in Ex. 1.

There were obtained 11.6 g of a catalytic solid containing 14.05% of V.

The polymerization test of Example 1 was repeated, but using 0.0124 g of the above catalytic solid, thus obtaining 56 g of polyethylene (see Table IV).

EXAMPLE 25

Following the same procedure as that described in ex. 1, the following substances were made to react with each other:
4.45 g (46.7 mMols) of MgCl$_2$;
4.95 g (23.2 mMols) of TiCl$_3$.1/3AlCl$_3$;
3.65 g (23 mMols) of VCl$_3$;
28.3 cc (487 mMols) of anhydrous ethyl alcohol;
90 cc of 1.2-dichloroethane.

To the suspension thus obtained were thereupon added, in 1.5 hours and at 50° C., 56 cc (487 mMols) of SiCl$_4$ and the mixture was then reflux-heated for 3 hours.

Successively it was proceeded as described in Example 1, until isolation of 11.3 g of a catalytic solid containing 1.30% of Ti and 9.65% of V.

The polymerization test of Ex. 1 was then repeated, but using 0.0121 g of the above catalytic solid, thereby obtaining 403 g of polyethylene (see Table IV).

EXAMPLE 26

Example 1 was repeated, but using 5.7 g (35.7 mMols) of VCl$_3$ instead of TiCl$_3$.⅓AlCl$_3$, and successively 31.3 cc (285 mMols) of TiCl$_4$ instead of SiCl$_4$.

Thereby were obtained 11.5 g of a catalytic solid containing 7.2% of Ti and 13.55% of V.

The polymerization test of Example 1 was then repeated, but using 0.011 g of the above catalytic solid, thereby obtaining 361 g of polyethylene (see Table IV).

EXAMPLE 27

Into a 250 cc flask, fitted with a stirrer, there were introduced:
9.55 g (100 mMols) of anhydrous MgCl$_2$;
2.15 g (10 mMols) of TiCl$_3$.⅓AlCl$_3$ (of the type used in Ex. 20);
80 cc of ISOPAR G;
5.7 cc (40 mMols) of ethyl benzoate;
51.6 cc (330 mMols) of 2-ethyl-hexyl alcohol.
The suspension was then heated until dissolution (3 hours at 140° C.).

The solution thus obtained was dripped for one hour, at 0° C., into 161.5 cc of a 26.6% heptane solution of AlEt$_2$Cl (356 mMols). The mixture was thereupon heated at 80° C., thus obtaining the formation of a solid, and there were then introduced 1.4 cc (10 mMols) of ethyl benzoate.

After heating at 80° C. for 2 hours, the liquid was separated at 80° C.; the solid residue was then treated with 62 cc of a heptane solution of AlEt$_2$Cl (137.4 mMols) for 2 hours at 80° C., whereafter the liquid was separated and the solid was washed with heptane at 80° C. until disappearance of the chlorine-ions.

The drying was carried out as in example 1 and 12.6 g of a catalytic solid containing 3.8% of Ti were obtained.

The polymerization test of propylene was carried out in a 2.5 lt autoclave fitted with a stirrer and containing 1000 cc of anhydrous hexane, 1 g of Al (i—Bu)$_3$, 0.253 g of methyl p-toluate, 0.100 g of catalytic solid and 300 Ncc of H$_2$, under a propylene pressure of 7 kg/cm$^2$. By operating for 4 hours at 60° C., there were obtained 190 g of polypropylene (see Table V).

EXAMPLE 28

Into a 250 cc flask fitted with a stirrer there were introduced:

9.55 g (100 mMols) of anhydrous $MgCl_2$;
0.85 g (4 mMols) of $TiCl_3 \cdot \frac{1}{3}AlCl_3$;
80 cc of ISOPAR G;
1.7 cc (11.9 mMols) of ethyl benzoate;
40.6 cc (260 mMols) of 2-ethyl-hexyl alcohol.

By heating the mixture for 3 hours at 140° C., there was obtained an opalescent solution which was dripped for 1 hr. at 0° C., into 400 cc (3648 mMols) of $TiCl_4$. Thereupon the mixture was heated at 80° C., thereby obtaining the formation of a solid, and there were then introduced 4.5 cc (31.5 mMols) of ethyl benzoate. This mixture was heated for 2 hours at 80° C. and at the same temperature the liquid was separated; the solid residue was treated with 200 cc (1824 mMols) of $TiCl_4$ for 2 hours at 90° C., whereafter the catalytic solid was separated as in example 27, thereby obtaining 11.5 g of catalyst component containing 2.9% of Ti.

The polymerization test of example 27 was repeated, but using 0.064 g of catalytic solid, and there were obtained 390 g of polypropylene (see Table V).

TABLE I

| Example No. | $TiCl_3$ moles (*) | $MgCl_2$ moles (*) | EtOH moles (*) | Decomposition agent Type | Decomposition agent moles (*) | Ti % | Polymerization of Ethylene Yield g/g Ti | MIE g/10 min. | $\frac{MIN}{MIE}$ | Bulk Density g/cc |
|---|---|---|---|---|---|---|---|---|---|---|
| 1 | 1.0 | 1.0 | 8.2 | $SiCl_4$ | 8.1 | 14.15 | 176,600 | 0.1 | 7.3 | 0.36 |
| 2 | 1.0 | 2.0 | 12.0 | $SiCl_4$ | 12.0 | 6.45 | 465,000 | 0.13 | 10.7 | 0.33 |
| 3 | 1.0 | 4.0 | 20.2 | $SiCl_4$ | 20.0 | 2.8 | 409,000 | 0.16 | 8.4 | 0.38 |
| 4 | 2.0 | 1.0 | 15.2 | $SiCl_4$ | 15.6 | 19.1 | 69,300 | 0.18 | 8.61 | 0.39 |
| 5 | 1.0 | 1.0 | 8.2 | $SiCl_4$ | 4.1 | 14.3 | 88,600 | 0.11 | 7.3 | 0.33 |
| 6 | 1.0 | 1.0 | 8.2 | $SiCl_4$ | 16.2 | 15.0 | 159,600 | 0.30 | 8.05 | 0.40 |
| 7[1] | 1.0 | 1.0 | 12.3 | $SiCl_4$ | 12.4 | 16.0 | 48,000 | 0.65 | 8.15 | 0.40 |
| 8 | 1.0 | 2.0 | 12.1 | $AlCl_3$ | 6.0 | 11.35 | 135,600 | 0.18 | 10.0 | 0.25 |
| 9 | 1.0 | 2.0 | 12.2 | $AlEt_3$ | 6.1 | 9.65 | 121,000 | 0.12 | 11.5 | 0.32 |
| 10[2] | 1.0 | 1.0[2] | 10.2 | $SiCl_4$ | 10.3 | 12.25 | 163,000 | 0.32 | 8.15 | 0.31 |

[1] As a solvent there is used trichloroethylene instead of 1,2-dichloroethane
[2] There is used Mg(OEt)Cl instead of $MgCl_2$
(*) The numbers reported in the table indicate only the molar ratios between reactants

TABLE II

| Example No. | $TiCl_3$ARA $TiCl_3$ moles (*) | ROH | Moles (*) | Solvent | $MgCl_2$ moles (*) | R'OH | Moles (*) | Solvent |
|---|---|---|---|---|---|---|---|---|
| 11[1] | 1 | nBuOH | 4. | Dichloroethane | 2. | nBuOH | 4. | Dichloroethane |
| 12 | 1 | nBuOH | 4.1 | Dichloroethane | 1.9 | 1-AmOH | 4.4 | Dichloroethane |
| 13 | 1 | 2-Et-hexanol | 5. | Toluene | 0.66 | 2-Et-hexanol | 4.6 | Toluene |
| 14 | 1 | 2-Et-hexanol | 5. | Toluene | 4.9 | 2-Et-hexanol | 4.0 | Hexane |
| 15 | 1 | Phenol | 10.2 | Dichloroethane | 1. | EtOH | 4.1 | Dichloroethane |
| 16 | 1 | nBuOH | 4. | Dichloroethane | 1. | — | — | — |
| 17 | 1 | 2-Et-hexanol | 3.5 | Isopar G(2) | 1.5 | 2-Et-hexanol | 3.5 | Isopar G(2) |
| 18 | 1 | Diphenylsilandiol | 4. | Dichloroethane | 1 | EtOH | 4 | Dichloroethane |

| Example No. | Decomposition agent Type | Moles (*) | Ti % | Polymerization of Ethylene Yield g/g Ti | MIE g/10 min. | $\frac{MIN}{MIE}$ | Bulk Density g/cc |
|---|---|---|---|---|---|---|---|
| 11[1] | $SiCl_4$ | 23.6 | 5.55 | 531,000 | 0.21 | 9.78 | 0.39 |
| 12 | $SiCl_4$ | 20.2 | 10.8 | 201,000 | 0.21 | 10.2 | 0.35 |
| 13 | $SiCl_4$ | 13.5 | 9.45 | 144,700 | 0.62 | 8.8 | 0.35 |
| 14 | $AlEt_2Cl$ | 13.8 | 2.8 | 807,000 | 0.30 | 9.2 | 0.32 |
| 15 | $SiCl_4$ | 8.1 | 13.3 | 247,600 | 0.20 | 9.2 | 0.28 |
| 16 | $SiCl_4$ | 4.0 | 13.35 | 70,700 | 0.12 | 10.8 | 0.30 |
| 17 | $TiCl_4$ | 69.4 | 12.1 | 501,900 | 0.038 | 13.15 | 0.29 |
| 18 | $SiCl_4$ | 12.0 | 15.35 | 28,900 | 0.11 | 10.0 | 0.26 |

[1] There is used delta-$TiCl_3$HR (from $TiCl_4$ by reduction with $H_2$ and activation) instead of delta-$TiCl_3$ARA (from $TiCl_4$ by reduction with Al and activation).
(*) The reported numbers indicate only the molar ratios between the reactants.
[2] A diluent consisting of a mixture of isoparaffinichydrocarbons boiling in the range 158–172° C. and sold by Esso Chemical Co.

TABLE III

| Example No. | TiCl₃ moles (*) | MgCl₂ moles (*) | C₂H₅OH moles (*) | Decomposition agent Type | Decomposition agent moles (*) | Ti % | Yield g/g Ti | MIE g/10 min. | MIN/MIE | Bulk Density g/cc |
|---|---|---|---|---|---|---|---|---|---|---|
| 19 | 1 | — | 6.2 | SiCl₄ | 6.2 | 28.5 | 1,400 | 0.14 | 12.5 | 0.26 |
| 20 | 1 | 1 | 5.1 | SiCl₃ | 5.1 | 15. | 144,000 | 0.11 | 10. | 0.38 |
| 21 | 1 | 1 | 8.2 | TiCl₄ | 8.1 | 19. | 257,000 | 0.15 | 10.5 | 0.35 |
| 22 | 1 | 2 | 12.0 | TiCl₄ | 12.0 | 14.35 | 650,000 | 0.146 | 9.8 | 0.28 |

(*) The numbers reported in the table indicate only the molar ratios between the reactants.

TABLE IV

| Example No. | VCl₃ mols (*) | TiCl₃ mols (*) | Ti(O-n-Bu)₃ mols (*) | MgCl₂ mols (*) | C₂H₅OH mols (*) | Decomposition agent Type | Decomposition agent mols (*) | Ti% and V% | Yield g/g(Ti + V) | MIE g/10 min. | MIN/MIE | Bulk density g/cm³ |
|---|---|---|---|---|---|---|---|---|---|---|---|---|
| 23 | — | — | 1 | 1 | 4 | SiCl₄ | 4 | 11.75 — | 78,900 | 0.07 | 13.3 | — |
| 24 | 1 | — | — | 1 | 11.1 | SiCl₄ | 11.2 | — 14.05 | 32,200 | 95 | — | — |
| 25 | 1 | 1 | — | 2 | 21.0 | SiCl₄ | 21.0 | 1.3 9.65 | 305,300 | 0.24 | 8.12 | 0.39 |
| 26 | 1 | — | — | 1 | 8.2 | TiCl₄ | 8.2 | 7.2 13.55 | 158,300 | 0.14 | 10.1 | — |

(*) The reported numbers indicate only the ratios between reactants.

TABLE V

| Example No. | TiCl₃ mols (*) | MgCl₂ mols (*) | 2-Ethylhexanol mols (*) | Ethyl benzoate mols (*) | Decomposition agent Type | Decomposition agent mols (*) | Ti % | Yield g/g Ti | Isotacticity Index | Intrinsic Viscosity dl/g | Bulk density g/cm³ |
|---|---|---|---|---|---|---|---|---|---|---|---|
| 27 | 1 | 10 | 33 | 5 | AlEt₂Cl | 50 | 3.8 | 50,000 | 80 | 1.79 | 0.37 |
| 28 | 1 | 25 | 65 | 10.8 | TiCl₄ | 1367 | 2.9 | 210,000 | 93 | 2.37 | 0.43 |

(*) The numbers reported indicate only the molar ratios between the reactants.

What we claim is:

1. Components of catalysts for the polymerization of olefins obtained by reacting in an apolar solvent:
    (a) a preformed product of the reaction between:
        (a.1) a compound of trivalent Ti or V of the formula $MeR_nX_{3-n}$, wherein Me is Ti or V, R is a group OR', NR'₂ or OCOR' in which R' is alkyl, cycloalkyl or aryl with from 1 to 12 carbon atoms, X is halogen, and $0 \leq n \leq 3$;
        (a.2) an organic compound containing at least one OH group selected from the group consisting of aliphatic, cycloaliphatic and aromatic alcohols with from 1 to 18 carbon atoms, phenols with from 6 to 18 carbon atoms, and silanols $R'_pSi(OH)_{4-p}$ wherein R' has the same meaning as in (a.1) and $1 \leq p \leq 3$; and
        (a.3) a Mg compound selected from Mg oxide, Mg hydroxide, Mg salts of oxygenated inorganic acids and compounds $R_qMgX_{2-q}$, wherein R is a group OR', OH or OCOR', in which R' has the same meaning as in (a.1), X is halogen and $0 \leq q \leq 2$; with
    (b) a compound selected from the group consisting of Al trialkyls, Al alkyl halides, halogen-silanes, Si, Al, Sn and B halides, hydrogen halides and TiCl₄.

2. Catalyst components according to claim 1 consisting of the product obtained by reacting:
    (a) the product of the reaction between TiCl₃, a hydroxyl compound selected from the group consisting of aliphatic alcohols with from 2 to 8 carbon atoms and phenol, and MgCl₂; with
    (b) a compound selected from the group consisting of SiCl₄, Cl₃SiCH₃, ClSi(CH₃)₃, Cl₃SiH, TiCl₄, AlCl₃, Al(C₂H₅)₂Cl, Al(C₂H₅)Cl₂, Al(C₂H₅)₃, SnCl₄, BCl₃ and hydrogen halides.

3. Catalysts for the polymerization of ethylene or mixtures thereof with minor amounts of alpha-olefins CH₂=CHR, wherein R is an alkyl with from 1 to 8 carbon atoms; obtained by reaction of a catalyst component according to claim 1 with an organometallic aluminum compound selected from the group consisting of Al-trialkyls and Al-alkyl halides.

4. Catalyst components according to claim 1, containing in a chemically combined form an electron-donor compound in an amount comprised between 0.2 and 3 moles per g. atom of Ti or V.

5. A catalyst for the polymerization of alpha-olefins CH₂=CHR, wherein R is an alkyl or aryl radical with from 1 to 8 carbon atoms, or mixtures thereof with minor proportions of ethylene, obtained by mixing a catalyst component as defined in claim 4 with an Al-alkyl compound.

* * * * *